United States Patent [19]

Kidd

[11] E Patent Number: Re. 33,393

[45] Reissued Date of Patent: Oct. 16, 1990

[54] SELECTIVE REMOVAL OF HYDROGEN SULFIDE OVER ZINC TITANATE AND ALUMINA

[75] Inventor: Dennis R. Kidd, Dewey, Okla.

[73] Assignee: Phillips Petroleum Company, Bartlesville, Okla.

[21] Appl. No.: 479,314

[22] Filed: Feb. 13, 1990

Related U.S. Patent Documents

Reissue of:

[64] Patent No.: 4,725,415
Issued: Feb. 16, 1988
Appl. No.: 869,766
Filed: Jun. 2, 1986

[51] Int. Cl.[5] ..... C01B 17/16; C01B 31/20

[52] U.S. Cl. ..... 423/230

[58] Field of Search ..... 423/230

[56] References Cited

U.S. PATENT DOCUMENTS

| | | | |
|---|---|---|---|
| 4,097,585 | 6/1978 | Fischer | 423/574 R |
| 4,287,050 | 9/1981 | Eastman et al. | 208/215 |
| 4,311,683 | 1/1982 | Hass et al. | 423/573 G |
| 4,313,820 | 2/1982 | Farha et al. | 423/230 |
| 4,371,507 | 2/1983 | Farha, Jr. et al. | 423/230 |
| 4,371,728 | 2/1983 | Farha, Jr. et al. | 585/258 |
| 4,446,013 | 5/1984 | Aldag, Jr. et al. | 208/135 |
| 4,522,709 | 6/1985 | Aldag, Jr. et al. | 208/216 R |

*Primary Examiner*—John Doll
*Assistant Examiner*—Lori F. Cuomo
*Attorney, Agent, or Firm*—Charles W. Stewart

[57] ABSTRACT

Hydrogen sulfide is removed from a fluid stream containing hydrogen sulfide by contacting the fluid stream under suitable absorbing conditions with an absorbing composition comprising zinc titanate and alumina promoted with at least one metal selected from tungsten and molybdenum and at least one metal selected from Group VIII of the Periodic Table.

27 Claims, No Drawings

SELECTIVE REMOVAL OF HYDROGEN SULFIDE OVER ZINC TITANATE AND ALUMINA

Matter enclosed in heavy brackets [ ] appears in the original patent but forms no part of this reissue specification; matter printed in italics indicates the additions made by reissue.

*This is a reissue application of Ser. No. 869,766, filed June 2, 1986, now U.S. Pat. No. 4,725,415, patented Feb. 16, 1988.*

This invention relates to an improved process for selectively removing hydrogen sulfide from fluid streams.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

A variety of methods are available to remove sulfur from a fluid stream if the sulfur is present as hydrogen sulfide. These methods include using alkaline regents that unselectively absorb all acid gases. Other methods include the use of selective solid absorbants such as zinc oxide and barg iron ore. However, in general, these solid absorbants are not regenerable to their original form and must be discarded when they have become completely sulfided.

U.S. Pat. No. 4,371,728 discloses a composition comprising zinc, titanium and at least one metal promoter which is an effective absorbing composition for hydrogen sulfide and which possesses the property of being regenerable to the original absorbing composition state in the presence of oxygen when fully sulfided. Although the composition disclosed by U.S. Pat. No. 4,371,728 is an effective absorbing composition for hydrogen sulfide, it has been found that the addition of alumina, in an amount within the range of about 10 weight-% to about 55 weight-% based upon the combined weight of the zinc, titanium and alumina, to the composition provides a more effective absorbing composition. It is thus an object of this invention to provide an improved process for selectively removing hydrogen sulfide from fluid streams. It is a further object of this invention to provide an improved removal or absorbing composition which possesses the property of being regenerable to the original absorbing composition state in the presence of oxygen when fully sulfided.

In accordance with the present invention, an absorbing composition comprising zinc titanate and alumina, wherein the alumina is present in an amount within the range of about 10 weight-% to about 55 weight-%, is promoted with at least one metal selected from tungsten and molybdenum and at least one metal selected from Group VIII of the Periodic Table. The promoted absorbing composition is then utilized to selectively remove hydrogen sulfide from a fluid stream containing hydrogen sulfide. The absorbing composition can be formed by initially combining zinc titanate and alumina and thereafter adding the metal promoters in accordance with any of the methods known in the art. Once the absorbing composition has been prepared, fluid streams which contain hydrogen sulfide are contacted with the absorbing composition under suitable absorbing conditions to substantially reduce the concentration of hydrogen sulfide in the fluid stream.

It is believed that the hydrogen sulfide is being absorbed by the absorbing composition and thus the terms "absorption process" and "absorbing composition" are utilized for the sake of convenience. However, the exact chemical phenomenon occurring is not the inventive feature of the process of the present invention and the use of the term "absorb" in any form is not intended to limit the present invention.

The selective absorption process is preferably carried out in cycles comprising an absorption period and a regeneration period for the absorbing composition. The absorption period comprises contacting a fluid stream which contains hydrogen sulfide with the absorbing composition to thereby selectively remove hydrogen sulfide from the fluid stream. The absorbing composition becomes sulfided during the absorption period. When the absorbing composition becomes sulfided to the point that regeneration is desirable, preferably when it is nearly completely sulfided, an oxygen-containing gas is passed in contact with the absorbing composition to regenerate the absorbing composition and convert the absorbed sulfur to an oxide.

The chemical changes that are believed to occur in the absorbing composition during this cyclic process where sulfur is present are summarized in the following equations:

$$Zn_2TiO_4 + 2H_2S \rightarrow 2ZnS + TiO_2 + 2H_2O \quad \text{I}$$

$$ZnS + \text{Oxygen} \rightarrow ZnO + SO_x \quad \text{(II)}$$

$$2ZnO + TiO_2 \rightarrow Zn_2TiO_4 \quad \text{(III)}$$

Other objects and advantages of the invention will be apparent from the foregoing description of the invention and the appended claims as well as from the detailed description of the invention which follows.

The absorbing composition of the present invention may be utilized to remove hydrogen sulfide from any suitable fluid stream. The hydrogen sulfide may be produced by the hydrodesulfurization of organic sulfur compounds or may be originally present in the fluid stream as hydrogen sulfide. Suitable fluid streams include light hydrocarbons such as methane, ethane, and natural gas; petroleum products and products from extraction and/or liquefaction of coal and lignite; a Claus tail gas; products from tar sands and shale oil; coal derived synthesis gas; gases such as hydrogen and nitrogen; fluid oxides of carbon; steam and the inert gases such as helium and argon. Gases that adversely affect the removal of hydrogen sulfide and which should be absent from the fluid streams being processed are oxidizing agents such as molecular oxygen, the halogens, the oxides of nitrogen, and the like.

The absorbing composition of the present invention may be utilized to remove hydrogen sulfide from olefins such as ethylene. This process, however, should be carried out in the absence of free hydrogen to avoid hydrogenation. Olefin streams should not be hydrodesulfurized as this may result in undesirable hydrogenation of at least a portion of the olefins to paraffins.

The absorbing composition of the present invention may be utilized to reduce the concentration of hydrogen sulfide in a fluid stream to any suitable amount. The concentration of hydrogen sulfide in a fluid stream will generally be reduced to below about 100 ppm and will more preferably be reduced to below about 10 ppm.

The absorbing composition employed in the process of the present invention is a composition comprising zinc, titanium and alumina promoted with at least one metal selected from tungsten and molybdenum and at least one metal selected from Group VIII of the Periodic Table. The zinc and titanium are generally present in the absorbing composition as zinc titanate. The promoters, comprising at least one metal selected from tungsten and molybdenum and at least one metal selected from Group VIII of the Periodic Table, may be present in the absorbing composition as oxides, sulfides or as free elements.

The absorbing composition of the present invention may be prepared by any suitable method known in the art. A preferred method of preparation for the absorbing composition of the present invention is to form a hydrogel comprising zinc titanate and alumina to which the promoters are then added.

In accordance with the preferred method of preparation, the absorbing composition is prepared by first preparing zinc titanate which is then reduced to a small size. The resulting material is mixed with hydrosol of a suitable acidic material comprising alumina. A suitable base is then added to the mixture to form a hydrogel. The resulting hydrogel is dried slowly and calcined to form a hydrogel derived absorbing composition of zinc titanate and alumina.

The promoters, comprising at least one metal selected from tungsten and molybdenum and at least one metal selected from Group VIII of the Periodic Table, are then added to the hydrogel derived absorbing composition of zinc titanate and alumina. The promoters may be added separately or in the form of a metal tungstate or metal molybdate.

The zinc titanate portion of the absorbing composition may be prepared by intimately mixing suitable portions of zinc oxide and titanium dioxide, preferably in a liquid such as water, and calcining the mixture in the presence of free oxygen at a temperature in the range of about 650° C. to about 1050° C., preferably in the range of about 675° C. to about 975° C., to form zinc titanate. A calcining temperature in the range of about 800° C. to about 850° C. is most preferred because the surface area of the zinc titanate is maximized in this temperature range, thus producing a more active zinc titanate. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active zinc titanate. Preferably the titanium dioxide, has an average particle size of less than 100 millimicrons and more preferably less than 30 millimicrons. Flame hydrolyzed titanium dioxide has extremely small particle size and is particularly preferred in preparing the zinc titanate. The atomic ratio of zinc to titanium can be any suitable ratio. The atomic ratio of zinc to titanium will generally lie in the range of from about 1:1 to about 3:1 and will preferably lie in the range of from about 1.8:1 to about 2.2:1 because the activity of the zinc titanate is greatest for atomic ratios of zinc to titanium in this range. The term "zinc titanate" is used regardless of the atomic ratio of zinc to titanium.

The zinc titanate portion of the absorbing composition may also be prepared by coprecipitation from aqueous solutions of a zinc compound and a titanium compound. The aqueous solutions are mixed together and the hydroxides are precipitated by the addition of ammonium hydroxide. The precipitate is then washed, dried and calcined, as described in the preceding paragraph, to form zinc titanate.

The resulting zinc titanate is reduced to a suitable size for mixing with a hydrosol of alumina by any suitable method such as treatment in an ultrasonic disrupter. The zinc titanate may be reduced to any suitable size with a particle size in the range of about 1.0 to about 10 microns being preferred.

The resulting zinc titanate, having a fine particle size, is mixed with a hydrosol of alumina. Any suitable form of alumina may be utilized. Alumina hydrate is particularly preferred because a hydrosol of alumina hydrate is readily converted to a hydrogel and then to the oxide phase after calcination.

After the zinc titanate has been thoroughly mixed into the hydrosol, a suitable base is added to convert the hydrosol to a hydrogel. Any suitable base such as alkali metal hydroxides, ammonium hydroxide, or urea may be utilized. Ammonium hydroxide is the preferred base because it does not have any metallic component that would remain in the hydrogel.

The resulting hydrogel is dried slowly so that water will not be removed so rapidly that the hydrogel structure will collapse which would result in an excessive loss of pore volume and surface area in the finished hydrogel derived absorbing composition. Any suitable drying time can be utilized which does not result in too rapid removal of water. Preferably, the drying time is in the range of about 8 hours to about 24 hours.

Any suitable temperature can be utilized for the drying of the zinc titanate and alumina hydrogel but again the temperature should be such that too rapid a removal of water does not result. The temperature is preferably in the range of about 35° C. to about 150° C. The most preferred drying condition is to start the drying process at about 80° C. and increase the temperature slowly to about 120° C. during the drying time.

After the zinc titanate and alumina hydrogel has been dried, it is then calcined in the presence of free oxygen to form the hydrogel derived absorbing composition. Any suitable free oxygen-containing gas may be utilized, with air being preferred because of its availability. Also, any suitable time and temperature for calcining may be utilized with a preferred time being about two hours and a preferred temperature being in the range of about 425° C. to about 650° C. and more preferably in the range of about 480° C. to about 600° C. Although the dried zinc titanate and alumina hydrogel can be placed directly into a preheated furnace or kiln for calcining, it is preferable for the hydrogel to attain its final temperature during a heating period of about two hours.

In accordance with this invention, the hydrogel derived absorbing composition of zinc titanate and alumina must contain an amount of alumina in the range of about 10 weight-% to about 55 weight-% based upon the combined weight of the zinc titanate and alumina. The amount of alumina present in the hydrogel derived absorbing composition will more preferably be in the range of about 30 weight-% to about 50 weight-% based upon the combined weight of the zinc titanate and alumina.

The absorbing composition of the present invention is promoted with at least one metal selected from tungsten and molybdenum and at least one metal selected from Group VIII of the Periodic Table. Any suitable Group VIII metal may be used in accordance with this invention. Preferably, the Group VIII metal is selected from the group consisting of iron, cobalt, nickel, ruthenium, rhodium and palladium. Of these metals, cobalt and nickel are the most preferred.

The promoters may be added to the absorbing composition either in their elemental form or in the form of suitable compounds.

Molybdenum compounds suitable for use as a promoter are ammonium molybdate, potassium molybdate, molybdenum oxides such as molybdenum (IV) oxide and molybdenum (VI) oxide and the like and mixtures of two or more thereof.

Tungsten compounds suitable for use as promoter are ammonium tungstate, potassium tungstate, tungsten oides such as tungsten (IV) oxide and tungsten (VI) oxide and the like and mixtures of two or more thereof.

Metal compounds suitable for use as a promoter are metal acetates, metal carbonates, metal nitrates, metal oxides, metal sulfates, metal thiocyanates, and the like, and mixtures of two or more thereof, wherein the metals are selected from Group VIII of the Periodic Table.

The promoting elements can be added to the absorbing composition by any method known in the art. The tungsten and/or molybdenum and at least one Group VIII metal may be added individually by impregnating the hydrogel with a solution, either aqueous or organic, that contains a promoting element. After the promoting element has been added to the hydrogel, the hydrogel is dried to remove essentially all of the solvent.

After drying the impregnated hydrogel, a solution of another promoting element may be added by impregnation if the tungsten or molybdenum and at least one Group VIII metal are not added in one step in the form of a metal tungstate or metal molybdate. The sequence in which the promoting elements are added is immaterial.

After the promoters have been added, the absorbing composition is calcined in the presence of oxygen at a temperature in the range of about 500° to about 650° C. until volatile matter is removed and the promoting metals are substantially converted to oxides. The time required for the calcining step will range from about 0.1 to about 10 hours.

Any suitable atomic ratio of tungsten and/or molybdenum to Group VIII metals may be utilized. The atomic ratio of tungsten and/or molybdenum to Group VIII metals is generally in the range of from about 10:1 to about 1:3 and is more preferably in the range of from about 2:1 to about 10:7. In like manner, any suitable concentration of promoter metals may be utilized. The promoter metals will be present in the absorbing composition in the oxide form and the combined concentration of the tungsten oxide and/or molybdenum oxide and the Group VIII metal oxide will generally be in the range from about 2.0 weight-% to about 25 weight-% based upon the weight of the absorbing composition, and will more preferably be in the range of about 5.0 weight-% to about 15 weight-% based upon the weight of the absorbing composition.

The processes of the present invention can be carried out by means of any apparatus whereby there is achieved an alternate contact of the absorbing composition with the fluid feed stream and thereafter of the absorbing composition with a gas containing molecular oxygen which is utilized to regenerate the absorbing composition. The process is in no way limited to the use of a particular apparatus. The process of this invention can be carried out using a fixed absorbing composition bed, fluidized absorbing composition bed or moving absorbing composition bed. Presently preferred is a fixed absorbing composition bed.

In order to avoid any casual mixing of the fluid feed stream, containing the hydrogen sulfide, with the oxygen-containing gas utilized in the regeneration step, provision is preferably made for terminating the flow of the fluid feed stream to the reactor and subsequently injecting an inert purging fluid such as nitrogen, carbon dioxide or steam. Any suitable purge time can be utilized but the purge should be continued until all hydrocarbon and/or hydrogen are removed. Any suitable flow rate of the purge fluid may be utilized. Presently preferred is a purge fluid flow rate in the range of about 800 GHSV to about 1200 GHSV.

Any suitable temperature for the processes of the present invention may be utilized. The temperature will generally be in the range of about 150° C. to about 650° C. and will more preferably be in the range of about 250° C. to about 500° C.

Any suitable temperature may be utilized to regenerate the absorbing composition from its sulfided form back to the original absorbing composition form. The temperature will generally be in the range of about 370° C. to about 815° C. A temperature of at least 540° C. is preferred to effect the conversion within a reasonable time.

Any suitable pressure for the processes of the present invention can be utilized. The pressure of the fluid feed stream being treated is not believed to have an important effect on the absorption process of the present invention. The pressure will be in the range of from about atmospheric to at least 2,000 psig during the treatment.

Any suitable residence time for the fluid feed stream in the presence of the absorbing composition of the present invention can be utilized. The residence time expressed as volumes of gas at standard temperature and pressure per volume of absorbing composition per hour will generally be in the range of about 10 to about 10,000 and will more preferably be in the range of about 250 to about 2500.

When the absorbing composition is completely sulfided it will no longer combine with the hydrogen sulfide in the manner set forth in equation (I). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygen-containing gas is then introduced to oxidize the zinc sulfide in accordance with equation (II). Also at the temperature at which the oxidation of the zinc sulfide is effected, the zinc oxide thus produced recombines with the titanium dioxide to resynthesize the original zinc titanate in accordance with equation (III).

The amount of oxygen supplied during the regeneration step will generally be in an amount sufficient to at least substantially remove sulfur from the absorbing composition. The regeneration step is conducted at generally about atmospheric pressure. The temperature for the regeneration step is preferably maintained in the range of about 370° to about 815° C. and is more preferably maintained at about 540° C. in order to both oxidize the zinc sulfide and convert the zinc oxide and titanium dioxide to zinc titanate with a resonable time.

The following examples are presented in further illustration of the invention.

EXAMPLE I

In this example the experimental procedure for the removal of $H_2S$ from gas streams by means of various solid sorbent materials is described.

The tests were carried out in a single reactor unit comprising a ¾" O.D. stainless steel reactor. The reactor, which was maintained at a pressure of about 9.0 psig, was operated in a fixed bed down flow mode using 20 cc of sorbent. Within the reactor, the sorbent was heated to the reaction temperature in a stream of nitrogen. When the desired temperature was attained, the nitrogen flow was stopped and the simulated Claus tail gas and, when used, water vapor flows were started. The water vapor was generated by pumping water through a heated line that was connected to the top of the reactor. The composition of the simulated Claus tail gas was controlled by mixing three feed gases. The compositions of the feed gases were as follows: (a) $H_2S$ blend: 1.03 volume-% $H_2S$, 0.135 volume-% $CS_2$, 0.139 volume-% COS, balance $N_2$; (b) $SO_2$ blend: 1.22 volume-% $SO_2$, 2.93 volume-% CO, balance $N_2$; and (c) $H_2$.

The progress of the absorption was followed by measuring the $H_2S$ concentration in the reactor effluent after the water vapor had been condensed and removed from the effluent. $H_2S$ concentrations were measured with Draeger tubes suited to the concentration ranges encountered.

EXAMPLE II

This example describes the sorbent materials which were tested in accordance with the procedures set forth in Example I.

Sorbent A: comprised $Co/Mo/Zn_2TiO_4$ with 3.1 weight-% Co (as CoO) and 8.3 weight-% Mo (as $MoO_3$). Sorbent A was prepared in the following manner: First, $Zn_2TiO_4$ was prepared essentially in accordance with the procedure set forth in the example of U.S. Pat. No. 4,376,698 (column 7, lines 20–31). Then a solution comprising 306 grams of $(NH_4)_6Mo_4O_{24}.4H_2O$ (lot KHLZ: Mallinckordt, Inc.; St. Louis, Mo.) in 2.0 liters of distilled water was added, with stirring, to 500.5 grams of $Zn_2TiO_4$. After 2 hours of intermittent stirring, the supernatant solution was decanted. The wet solid residue was dried on a hot plate for about 1 hour and then calcined at about 1000° F. for about 3 hours. To the thus heat treated Mo-impregnated $Zn_2TiO_4$ was added a solution comprising 272 grams of $Co(NO_3)_2.6H_2O$ (lot KHPA; Mallinckrodt, Inc.) in 2.0 liters of distilled water. After about 2 hours of intermittent stirring, the supernatant solution was decanted. The wet, solid residue was dried on a hot plate for about 1 hour and then calcined at about 1000° F. for about 3 hours. The BET/$N_2$ surface area of Sorbent A was about 10 $m^2/g$.

Sorbent B: comprised $Co/Mo/Zn_2TiO_4/Al_2O_3$ with 2.2 weight-% Co (as CoO), 10.8 weight-% Mo (as $MoO_3$), 55.9 weight-% $Zn_2TiO_4$ and 31.1 weight-% $Al_2O_3$. Sorbent B was prepared in the following manner: First, $Zn_2TiO_4$ was prepared by mixing zinc oxide and flame-hydrolyzed titania, drying the mixture and calcining it, essentially in accordance with the procedure described in Example 1 of U.S. Pat. No. 4,263,133. Then $Zn_2TiO_4$ was mixed with $Al_2O_3$ in accordance with the following procedure. About 80 grams of α-alumina monohydrate were dispersed in 1,500 mL of water with stirring. 10 mL of nitric acid were added to the suspension so as to lower the pH to about 1.4. After stirring for about 30 minutes, about 150 grams of $Zn_2TiO_4$ were added with stirring and the pH of the resulting slurry was adjusted to about 8.5 by adding, with stirring, 10 mL of $NH_4OH$. The formed $Zn_2TiO_4/Al_2O_3$ hydrogel was then transferred to an evaporating dish and dried at a temperature of about 75° C. for about 20 hours and then at a temperature of about 125° C. for about 24 hours. The thus dried hydrogel was then calcined in the presence of a free-oxygen containing gas at a temperature of 1000° F. for about 2 hours.

The final steps of the preparation of Sorbent B were carried out as follows. 50 grams of $(NH_4)_6Mo_7O_{24}.4H_2O$ were dissolved in 360 mL of distilled water with heating and stirring. Then 90 grams of the dried $Zn_2TiO_4/Al_2O_3$ gel were added to the solution. The slurry was intermittently stirred for about 2 hours and then allow to settle. The supernatant solution was decanted, and the Mo-impregnated sorbent was dried at 120° C. overnight and calcined at 1000° F. for three hours. The calcined material was added to a solution of 48.4 grams of $Co(NO_3)_2.6H_2O$ in 360 ml with stirring. The Co, Mo-impregnated Sorbent B was then dried at 120° C. and calcined at 1000° F. as outlined above. The BET/$N_2$ surface area of Sorbent B was 88 $m^2/g$.

Sorbent C: comprised $Ni/Mo/Zn_2TiO_4/Al_2O_3$ with 2.2 weight-% Ni (as NiO), 10.8 weight-% Mo (as $MoO_3$), 55.9 weight-% $Zn_2TiO_4$ and 31.1 weight-% $Al_2O_3$. Sorbent C was prepared in the same manner as Sorbent B.

Sorbent D: comprised $Co/Mo/Zn_2TiO_4/Al_2O_3$ with 2.4 weight-% Co (as CoO), 8.0 weight-% Mo (as $MoO_3$), 48.4 weight-% $Zn_2TiO_4$ and 41.2 weight-% $Al_2O_3$. Sorbent D was prepared in the same manner as Sorbent B except that 115 grams of α-alumina monohydrate and 115 grams of $Zn_2TiO_4$ were employed in forming the hydrogel.

Sorbent E: comprised of $Co/Mo/Zn_2TiO_4/Al_2O_3$ with 2.6 weight-% Co (as CoO), 6.5 weight-% Mo (as $MoO_3$), 35.0 weight-% $Zn_2TiO_4$ and 55.9 weight-% $Al_2O_3$. Sorbent E was also prepared in the same manner as Sorbent B except that 150 grams of α-alumina monohydrate and 80 grams of $Zn_2TiO_4$ were employed in forming the hydrogel.

Sorbent F: comprised $Co/Mo/Zn_2TiO\ 4/Al_2O_3$ with 5.1 weight-% CoO, 15.0 weight-% $MoO_3$, 5.2 weight-% ZnO, 2.8 weight-% $TiO_2$ and 71.9 weight-% $Al_2O_3$. Sorbent F was prepared by impregnating a Co/Mo-promoted $Al_2O_3$ support with Zn and Ti and then calcining the thus impregnated $Al_2O_3$ support, essentially in accordance with the procedure set forth in Example I of U.S. Pat. No. 4,287,050.

Sorbent G: comprised $Co/Mo/Al_2O_3$ with 3.2 weight-% Co and 7.8 weight-% Mo (BET/$N_2$ surface area: 282 $m^2/g$; marketed as Ketjen K-124-LD by Armak Catalyst Division of Akzona, Inc., Pasadena, Tex.).

EXAMPLE III

This example illustrates the use of the sorbents described in Example II within the procedure described in Example I for the removal of $H_2S$ from a simulated wet Claus process off-gas (Claus tail gas). For runs 1, 3, 4, 6 and 7 the Claus tail gas comprised 4800 ppm $H_2S$, 2820 ppm $SO_2$, 650 ppm COS, about 650 ppm $CS_2$, 0.68 volume-% CO, 27.7 volume-% $H_2O$ vapor and 67.8 volume-% $N_2$. For runs 2 and 5 the Claus tail gas comprised 10,700 ppm $H_2S$, 27 volume-% $H_2O$ and 72 volume-% $N_2$. Due to the differences in the two feeds, the results are presented as a function of the amount of sulfur (measured as a weight-% based upon the weight of the absorbing composition) absorbed by the absorbing composition as of the time of the reading. The test results are summarized in Table I.

TABLE I

| Run | Sorbent | $Zn_2TiO_4$: $Al_2O_3$ Ratio | Temp (°C.) | GHSV[a] | Run Time (min.) | Absorbed Sulfur (wt %)[b] | PPM $H_2S$ in Product | % Removal of $H_2S$ |
|---|---|---|---|---|---|---|---|---|
| 1 (Control) | A | 100:0 | 357 | 2000 | 30 | 1.11 | 5 | ~100 |
| | | | | | 90 | 3.33 | 677 | 86 |
| | | | | | 180 | 6.66 | 3,279 | 32 |
| 2 (Invention) | B | 65:35 | 399 | 1000 | 30 | .75 | 1 | ~100 |
| | | | | | 60 | 1.50 | 1 | ~100 |
| | | | | | 80 | 2.00 | 1 | ~100 |
| | | | | | 120 | 3.00 | 1 | ~100 |
| | | | | | 150 | 3.83 | 17 | ~100 |
| | | | | | 180 | 4.50 | 550 | 89 |
| | | | | | 225 | 5.40 | 1200 | 75 |
| 3 (Invention) | C | 65:35 | 399 | 1000 | 38 | .91 | 60 | 99 |
| | | | | | 75 | 1.80 | 30 | 99 |
| | | | | | 141 | 3.46 | 21 | ~100 |
| | | | | | 204 | 5.00 | 16 | ~100 |
| | | | | | 259 | 6.33 | 28 | 99 |
| | | | | | 320 | 7.78 | 130 | 97 |
| | | | | | 383 | 9.23 | 600 | 88 |
| 4 (Invention) | D | 54:46 | 357 | 2000 | 30 | 1.10 | 0 | 100 |
| | | | | | 90 | 3.31 | ~4 | ~100 |
| | | | | | 130 | 4.81 | 42 | 99 |
| | | | | | 180 | 6.09 | 3,015 | 37 |
| 5 (Control) | E | 38:62 | 357 | 1000 | 30 | .71 | 87 | 98 |
| | | | | | 60 | 1.42 | 90 | 98 |
| | | | | | 105 | 2.70 | 468 | 90 |
| | | | | | 125 | 3.00 | 2930 | 39 |
| 6 (Control) | F | 10:90 | 360–380 | 1000 | 25 | .63 | 21 | ~100 |
| | | | | | 70 | 1.75 | 310 | 94 |
| | | | | | 115 | 2.73 | 900 | 81 |
| 7 (Control) | G | 0:100 | 360 | 2000 | 20 | 1.06 | 748 | 84 |
| | | | | | 60 | 2.89 | 1,082 | 77 |
| | | | | | 160 | | 1,695 | 65 |
| | | | | | 350 | | 2,922 | 39 |

[a]Gas Hourly Space Velocity (cc/cc catalyst/hr)
[b]Based upon the weight of the absorbing composition The results of runs 1–4 show that the addition of alumina, in amounts of 35 weight-% and 46 weight-% respectively, to the $Co/Mo/Zn_2TiO_4$ and $Ni/Mo/Zn_2TiO_4$ absorbing compositions substantially increased the absorbing compositions' effectiveness in removing hydrogen sulfide from a fluid feed stream. The results of runs 5–7, however, show that the addition of alumina in an amount in excess of about 55 weight-% to the $Co/Mo/Zn_2TiO_4$ absorbing composition had no such beneficial effect. Based upon these results, it is believed that a concentration of alumina in the inventive absorbing composition in the range of about 10 weight-% to about 55 weight-% is critical to the invention, with the most preferred range being about 30 weight-% to about 50 weight-%.

EXAMPLE IV

This example illustrates the removal of $H_2S$ from a dry gas comprising 0.7 weight-% (7000 ppm) $H_2S$, 0.1 weight-% COS, 0.1 weight-% ppm $CS_2$ and 99.1 weight-% $N_2$. This gas was passed through the sorbent bed at a GHSV of about 2000 cc/cc catalyst/hr. The test results are summarized in Table II.

TABLE II

| Run | Sorbent | ZnTi:Al Ratio | Temp (°C.) | Run Time (min.) | PPM $H_2S$ in Product | % Removal of $H_2S$ |
|---|---|---|---|---|---|---|
| 8 (Control) | A | 100:0 | 357 | 60 | 10 | 99 9 |
| | | | | 120 | 45 | 99 |
| | | | | 150 | 159 | 98 |
| | | | | 210 | 845 | 88 |
| | | | | 250 | 1,246 | 82 |
| | | | | 280 | 1,822 | 74 |
| 9 (Invention) | D | 54:46 | 357 | 30 | 0 | 100 |
| | | | | 85 | 1 | 100 |
| | | | | 120 | 1 | 100 |
| | | | | 165 | 272 | 96 |

TABLE II-continued

| Run | Sorbent | ZnTi:Al Ratio | Temp (°C.) | Run Time (min.) | PPM $H_2S$ in Product | % Removal of $H_2S$ |
|---|---|---|---|---|---|---|
| | | | | 175 | 874 | 88 |
| | | | | 205 | 2,495 | 64 |
| | | | | 140 | 4,460 | 36 |

The results of runs 8 and 9 clearly show that in the first two hours on stream Sorbent D, containing 46 weight-% alumina, was considerably more effective in removing $H_2S$ from a dry feed gas than control Sorbent A. A comparison of the results of runs 8 and 9 with those of runs 1 and 3, which are set forth in Table I, further shows that the inventive absorbing compositions are more effective at removing hydrogen sulfide from a dry feed gas than from a wet feed gas.

While this invention has been described in detail for the purpose of illustration, it is not to be construed as limited thereby but is intended to cover all changes and modifications within the spirit and scope thereof.

That which is claimed is:

1. A process for removing hydrogen sulfide from a fluid stream containing hydrogen sulfide comprising the step of contacting said fluid stream under absorbing conditions with an absorbing composition comprising zinc titanate and alumina promoted with at least one metal selected from tungsten and molybdenum and at least one metal selected from Group VIII of the Periodic Table, wherein the concentration of alumina in said absorbing composition is in the range of about 10 weight-% to about 55 weight-% based upon the combined weight of the zinc titanate and alumina.

2. A process in accordance with claim 1 wherein the concentration of alumina in said absorbing composition is in the range of about 30 weight-% to about 50 weight-% based upon the combined weight of the zinc titanate and alumina.

3. A process in accordance with claim 1 wherein the combined concentration of the promoters, comprising at least one metal selected from tungsten and molybdenum and at least one Group VIII metal, in said absorbing composition is in the range of about 2.0 weight-% to about 25 weight-% based upon the weight of the absorbing composition.

4. A process in accordance with claim 3 wherein the combined concentration of said promoters in said absorbing composition is in the range of about 5.0 weight-% to about 15 weight-% based upon the weight of the absorbing composition.

5. A process in accordance with claim 1 wherein the atomic ratio of at least one metal selected from tungsten and molybdenum to said Group VIII metals in said absorbing composition is in the range of about 10:1 to about 1:3.

6. A process in accordance with claim 5 wherein said atomic ratio is in the range of about 2:1 to about 10:7.

7. A process in accordance with claim 1 wherein said zinc titanate is prepared by calcining a mixture of zinc oxide and titanium dioxide in the presence of molecular oxygen at a temperature in the range of about 650° C. to about 1050° C.

8. A process in accordance with claim 7 wherein the atomic ratio of zinc to titanium in said zinc titanate is in the range of about 1:1 to about 3:1.

9. A process in accordance with claim 8 wherein said atomic ratio is in the range of about 1.8:1 to about 2.2:1.

10. A process in accordance with claim 7 wherein the concentration of alumina in said absorbing composition is in the range of about 30 weight-% to about 50 weight-% based upon the combined weight of the zinc titanate and the alumina.

11. A process in accordance with claim 1 wherein said absorbing composition is derived from a hydrogel comprising zinc titanate and alumina.

12. A process in accordance with claim 11 wherein the hydrogel derived absorbing composition is prepared by calcining a mixture of zinc oxide and titanium dioxide in the presence of free oxygen at a temperature in the range of about 650° C. to about 1050° C. to form zinc titanate, mixing the thus formed zinc titanate in a powdered form with a hydrosol of alumina hydrate to form a zinc titanate/alumina hydrosol, adding ammonium hydroxide to convert said hydrosol to a hydrogel, drying and calcining said hydrogel to form a hydrogel derived composition of zinc titanate and alumina, adding promoters comprising at least one metal selected from tungsten and molybdenum and at least one Group VIII metal to said hydrogel derived composition of zinc titanate and alumina and calcining said hydrogel derived composition of zinc titanate and alumina to which said promoters have been added to form said hydrogel derived absorbing composition, wherein said promoters are present in said hydrogel derived absorbing composition in the oxide form.

13. A process in accordance with claim 12 wherein said hydrogel of zinc titanate and alumina is dried for a time in the range of about 8 hours to about 24 hours and at a temperature in the range of about 35° C. to about 150° C.

14. A process in accordance with claim 13 wherein the dried hydrogel of zinc titanate and alumina is calcined in the presence of free oxygen at a temperature in the range of about 425° C. to about 650° C. for a time of about 2 hours to form said hydrogel derived composition of zinc titanate and alumina.

15. A process in accordance with claim 12 wherein said hydrogel derived composition of zinc titanate and alumina to which said promoters have been added is calcined in the presence of free oxygen at a temperature in the range of about 425° C. to about 650° C. for a time in the range of about 0.1 hours to about 10 hours to form said hydrogel derived absorbing composition.

16. A process in accordance with claim 12 wherein the concentration of alumina in said hydrogel derived absorbing composition is in the range of about 30 weight-% to about 50 weight-% based upon the combined weight of the zinc titanate and the alumina.

17. A process in accordance with claim 12 wherein the atomic ratio of zinc to titanium in said hydrogel derived absorbing composition is in the range of about 1:1 to about 3:1.

18. A process in accordance with claim 17 wherein said atomic ratio is in the range of about 1.8:1 to about 2.2:1.

19. A process in accordance with claim 1 wherein said absorbing conditions comprise a temperature in the range of about [149] *150°* C. to about [538] *650°* C., a total system pressure in the range of about atmospheric to about 2000 psig and a residence time for said fluid stream in the presence of said absorbing composition in the range of about [0.1] *10* to about [50 liquid] *10000* volumes of said fluid stream per volume of said absorbing composition per hour.

20. A process in accordance with claim 19 wherein said absorbing conditions comprise a temperature in the range of about [204] *250°* C. to about [399] *500°* C., a total system pressure in the range of about [15 psig] *atmospheric* to about [200] *2000* psig and a residence time for said fluid stream in the presence of said absorbing composition in the range of about [1] *250* to about [5 liquid] *2500* volumes of said fluid stream per volume of said absorbing composition per hour.

21. A process in accordance with claim 1 wherein said absorbing composition is sulfided during said process.

22. A process in accordance with claim 21 additionally comprising the steps of:

discontinuing the flow of said fluid stream over said absorbing composition; and contacting said absorbing composition, after the flow of said fluid stream is discontinued, with a molecular oxygen-containing fluid under regeneration conditions to thereby regenerate said absorbing composition.

23. A process in accordance with claim 22 wherein said regeneration conditions comprise a feed rate of said molecular oxygen-containing fluid suitable to supply sufficient oxygen to remove substantially all of the sulfur from said absorbing composition, a temperature in the range of about 370° to about 815° C., and a pressure in the range of about atmospheric to about 100 psig.

24. A process in accordance with claim 23 wherein sulfur is removed as an oxide during said regeneration period.

25. A process in accordance with claim 22 additionally comprising the step of purging said absorbing composition with an inert fluid after the step of discontinuing the flow of said fluid stream and before the step of contacting said absorbing composition with an oxygen-containing fluid.

26. A process in accordance with claim 22 additionally comprising the steps of:

terminating the flow of said oxygen-containing fluid over said absorbing composition after said absorbing composition is substantially regenerated;

purging said absorbing composition with an inert fluid after the flow of said oxygen-containing fluid is terminated;

terminating the flow of said inert fluid over said absorbing composition after said oxygen-containing fluid is substantially purged from said absorbing composition; and recontacting said absorbing composition with said fluid stream after the flow of said inert fluid is terminated.

27. A process in accordance with claim 1 wherein the concentration of alumina in said absorbing composition is about 35 weight-% based upon the combined weight of the zinc titanate and alumina.

* * * * *